United States Patent
Hetzel et al.

(10) Patent No.: US 10,760,958 B2
(45) Date of Patent: Sep. 1, 2020

(54) METHOD FOR ADDITIVELY MANUFACTURING OF THREE-DIMENSIONAL OBJECTS

(71) Applicant: CL SCHUTZRECHTSVERWALTUNGS GMBH, Lichtenfels (DE)

(72) Inventors: Ralf Hetzel, Bad Staffelstein (DE); Johanna Hoch, Breitbrunn (DE); Benjamin Batyi, Coburg (DE)

(73) Assignee: Concept Laser GmbH, Lichtenfels (DE)

( * ) Notice: Subject to any disclaimer, the term of this patent is extended or adjusted under 35 U.S.C. 154(b) by 0 days.

(21) Appl. No.: 16/016,311

(22) Filed: Jun. 22, 2018

(65) Prior Publication Data

US 2019/0025117 A1    Jan. 24, 2019

(30) Foreign Application Priority Data

Jul. 21, 2017    (EP) .................................... 17182654

(51) Int. Cl.
*G01J 1/42* (2006.01)
*B29C 64/282* (2017.01)
(Continued)

(52) U.S. Cl.
CPC .......... *G01J 1/4257* (2013.01); *B22F 3/1055* (2013.01); *B23K 26/34* (2013.01); *B23K 26/354* (2015.10);
(Continued)

(58) Field of Classification Search
CPC .... G01J 1/4257; B29C 64/264; B29C 64/282; B29C 64/268; B29C 64/393;
(Continued)

(56) References Cited

U.S. PATENT DOCUMENTS

| | | | |
|---|---|---|---|
| 6,554,600 B1 * | 4/2003 | Hofmann | B29C 41/34 425/174.4 |
| 6,809,329 B1 * | 10/2004 | Evans | G21F 5/005 250/506.1 |

(Continued)

FOREIGN PATENT DOCUMENTS

| | | |
|---|---|---|
| CN | 205097566 U | 3/2016 |
| CN | 206132213 U | 4/2017 |

(Continued)

OTHER PUBLICATIONS

European Search Report Corresponding to Application No. 17182654 dated Jan. 19, 2018.

(Continued)

*Primary Examiner* — Seung C Sohn
(74) *Attorney, Agent, or Firm* — Dority & Manning, P.A.

(57) ABSTRACT

Apparatus (1) for additively producing three-dimensional objects (2) by successive layer-by-layer selective exposure and, accompanying this, successive layer-by-layer selective solidification of construction material layers made of a construction material (3) that can be solidified by means of an energy beam (4), including an exposure device (6) which is configured to produce an energy beam (4) for successive layer-by-layer selective exposure and, accompanying this, successive layer-by-layer selective solidification of construction material layers made of a construction material (3) that can be solidified by means of the energy beam (4), a measuring device (13) that is assignable or assigned to the exposure device (6) and configured to measure the power of the energy beam (4) that is produced by the exposure device (6), wherein the measuring device (13) comprises a measuring element (15) that comprises an energy beam input face (16), and at least an energy beam widening device (17).

20 Claims, 3 Drawing Sheets

(51) Int. Cl.
    *B29C 64/264*     (2017.01)
    *B33Y 30/00*     (2015.01)
    *B33Y 50/02*     (2015.01)
    *B23K 26/354*     (2014.01)
    *B23K 26/70*     (2014.01)
    *B29C 64/393*     (2017.01)
    *B29C 64/268*     (2017.01)
    *B22F 3/105*     (2006.01)
    *B23K 26/34*     (2014.01)
    *B28B 1/00*     (2006.01)
    *B28B 17/00*     (2006.01)

(52) U.S. Cl.
    CPC ............ *B23K 26/705* (2015.10); *B28B 1/001* (2013.01); *B28B 17/0081* (2013.01); *B29C 64/264* (2017.08); *B29C 64/268* (2017.08); *B29C 64/282* (2017.08); *B29C 64/393* (2017.08); *B33Y 30/00* (2014.12); *B33Y 50/02* (2014.12); *B22F 2003/1057* (2013.01)

(58) Field of Classification Search
    CPC ..... B28B 17/0081; B28B 1/001; B23K 26/34; B23K 26/705; B23K 26/354; B22F 3/1055; B22F 2003/1057; B22F 2003/1056; C04B 35/622; B33Y 50/00; B33Y 10/00; B33Y 50/02; B33Y 30/00
    USPC ........................................................ 250/216
    See application file for complete search history.

(56) References Cited

U.S. PATENT DOCUMENTS

| | | | |
|---|---|---|---|
| 9,238,310 | B2 | 1/2016 | Grebe et al. |
| 10,124,537 | B2 | 11/2018 | Schwarze et al. |
| 2010/0006228 | A1 | 1/2010 | Abe et al. |
| 2014/0027421 | A1* | 1/2014 | Notheis ................ B23K 26/046 219/121.81 |

FOREIGN PATENT DOCUMENTS

| | | |
|---|---|---|
| CN | 106768309 A | 5/2017 |
| EP | 2878402 A1 | 6/2015 |
| JP | 2001001409 A | 1/2001 |
| JP | 2004223789 A | 8/2004 |
| JP | 2009078558 A | 4/2009 |
| JP | 2010132960 A | 6/2010 |
| JP | 2013022965 A | 2/2013 |
| JP | 2015120342 A | 7/2015 |
| WO | 9608027 A1 | 3/1996 |
| WO | 2012130666 A1 | 10/2012 |

OTHER PUBLICATIONS

Machine Translated Japanese Office Action Corresponding to Application No. 2018005576 dated Jun. 11, 2019.
Takemi Inoue, Measuring and lighting of Takeshi, The journal of the Lighting Society, General Incorporated Lighting Society, vol. 72, No. 7, Japan, Jul. 1, 1988, p. 359-364.
Machine Translated Chinese Office Action Corresponding to Application No. 201710864002 dated Apr. 27, 2020.

* cited by examiner

METHOD FOR ADDITIVELY MANUFACTURING OF THREE-DIMENSIONAL OBJECTS

CROSS-REFERENCE TO RELATED APPLICATIONS

This application claims priority to European Patent Application serial no. 17 182 654.8 filed Jul. 21, 2017, the contents of which are incorporated herein by reference in their entirety as if set forth verbatim.

DESCRIPTION

The invention relates to an apparatus for additively producing three-dimensional objects by successive layer-by-layer selective exposure and, accompanying this, successive layer-by-layer selective solidification of construction material layers made of a construction material that can be solidified by means of an energy beam, comprising an exposure device which is configured to produce an energy beam for successive layer-by-layer selective exposure and, accompanying this, successive layer-by-layer selective solidification of construction material layers made of a construction material that can be solidified by means of the energy beam and comprising the further features of the claims.

Such an apparatus for additively producing three-dimensional objects is known per se. By means of an appropriate apparatus, three-dimensional objects to be produced are additively constructed by a successive layer-by layer selective exposure and, accompanying this, a successive layer-by-layer selective solidification of construction material layers made of a construction material that is solidified by means of an energy beam in the regions that correspond to the layer-related cross section of the object to be produced.

Further, it is known to assign a measuring device to the exposure device of a corresponding apparatus, said measuring device being configured to measure the power, in particular the power density, of the energy beam that is produced by the exposure device. Here, reproducible measurement results are required for a multiplicity of different powers of respective energy beams, i.e. in a comparatively broad power range of respective energy beams.

Depending on the output power of the exposure device, i.e., in particular, depending on the power of the energy beams that are to be measured in view of their power, the known measuring devices must be positioned relative to a reference point of the apparatus, in particular the construction plane or focal plane, in order to avoid damage to the measuring device on account of an areal energy influx that is too high, particularly in the case of high powers. Therefore, it has been necessary, to date, to appropriately position the measuring device depending on the output power of the exposure device or of the power of the energy beam; what is true here, in general, is that high power densities require a greater distance from the construction plane or focal plane than lower energy densities.

Therefore, the use or handling on known measuring devices is complicated and susceptible to errors since care has to be taken for each output power of the exposure device or of the power of the energy beam that the measuring device is positioned at a respectively correct distance from the construction plane or focal plane.

Consequently, the invention is based on the object of specifying an apparatus for additively producing three-dimensional objects, said apparatus being improved in relation to what was stated above, in particular in the view of a simplified measurement of the power (density) of an energy beam.

The object is achieved by an apparatus for additively producing three-dimensional objects in accordance with the claims. The claims that are dependent in this respect relate to possible embodiments of the apparatus.

The apparatus described herein ("apparatus") is configured for additively producing three-dimensional objects, i.e., for example, technical components or technical component groups, by successive layer-by-layer selective exposure and, accompanying this, successive layer-by-layer selective solidification of construction material layers made of a material that can be solidified in the regions that correspond to the layer-related cross section of the object to be produced. The construction material can be a particulate or powdery metal material, plastic material and/or ceramic material. The selective solidification of respective construction material layers that are to be solidified selectively is carried out on the basis of object-related construction data. Appropriate construction data describes the geometric-constructive form of the respective object to be produced additively and may, for example, contain "sliced" CAD data of the object to be produced additively. The apparatus may be embodied as an SLM apparatus, i.e. as an apparatus for carrying out selective laser melting methods (SLM methods), or as an SLS apparatus, i.e. as an apparatus for carrying out selective laser sintering methods (SLS methods). It is also conceivable for the apparatus to be embodied as a SEBM apparatus, i.e. as an apparatus for carrying out selective electron beam melting methods (SEBM methods).

The apparatus comprises the functional components that are typically required for carrying out additive construction processes. In particular, these include a coating device and an exposure device.

The coating device is configured to form construction material layers that are to be selectively exposed or selectively solidified in a construction plane or in a construction field of the apparatus, in which the successive layer-by-layer selective exposure and, accompanying this, the successive layer-by-layer selective solidification of construction material layers made of the construction material that can be solidified by means of an energy beam takes place.

The exposure device is configured to produce an energy beam, i.e., typically, a laser beam, for the successive layer-by-layer selective exposure and, accompanying this, the successive layer-by-layer selective solidification of construction material layers that are made of a material that can be solidified by means of the energy beam. As respective components of the exposure device, the exposure device may comprise an energy beam producing device, which is configured for the actual production of the energy beam, and a beam deflection device (scanner device), which is configured to deflect the energy beam onto a construction material layer that is to be selectively solidified.

A measuring device is assignable or assigned to the exposure device. The measuring device is configured to measure the power, i.e., in particular, the power density, of the energy beam that is produced by the exposure device. The measuring device comprises an input coupling region, by means of which an energy beam to be measured can be coupled into the measuring device. The input coupling region of the measuring device is typically formed by, or comprises, an energy beam input face that forms part of a measuring element of the measuring device; accordingly, the measuring device comprises a measuring element that comprises an energy beam input face. The measuring element of the measuring device can be embodied as, or at least comprise, an absorber element, which is configured to absorb the energy beam. Accordingly, the power or power density can be measured on the basis of an absorption of the energy beam that impinges on the measuring element and of a physical state change, in particular a thermal state change, of the measuring element that is connected therewith. Specifically, the power or power density can be measured on the basis of a heating of the measuring element that can be traced back to an absorption of the energy beam that impinges on the measuring element, with the heating of the measuring element facilitating the drawing of conclusions in relation to the power or power density of the energy beam.

At least an energy beam widening device is (optically) disposed or embodied to be upstream of the energy beam input face of the measuring device. Accordingly, the energy beam initially impinges on the energy beam widening device before it impinges on the energy beam input face of the measuring device. The energy beam widening device is configured to widen, in particularly optically widen, an energy beam that is to be measured in view of its power or power density—an (optical) widening of the energy beam typically being understood to mean an increase in the optical beam diameter of the energy beam. To this end, the energy beam widening device often comprises at least an energy beam widening element, optionally a plurality of energy beam widening elements, which is/are configured to widen an energy beam. An appropriate energy beam widening element may be e.g. an optical element, in particular a lens.

The energy beam widening device typically comprises an input coupling region, by means of which an energy beam that is to be widened can be coupled into the energy beam widening device, and an output coupling region, by means of which a widened energy beam can be coupled out of the energy beam widening device. The output coupling region of the energy beam widening device is typically arranged opposite the input coupling region of the measuring device during operation of the measuring device such that a widened energy beam that has been coupled out of the energy beam widening device can be coupled into the measuring element.

The possible widening of the energy beam by way of the energy beam widening device accounts for the aspects that are described in conjunction with the prior art set forth at the outset. By widening the energy beam, it is possible to avoid damage to the measuring device on account of an energy influx that is too high, particularly in the case of comparatively high output powers of the exposure device or comparatively high powers of the energy beam. Accordingly, the energy beam is widened, in particular, with the goal of reducing the energy influx that is introduced into the measuring device by way of the energy beam in order to avoid damage to the measuring device. What emerges therefrom is that, in principle, the measuring device may be positioned independently of the output power of the exposure device or of the power of the energy beam. As a consequence, the use or handling of the measuring device is less complicated and less susceptible to errors since care need not be taken for every output power of the exposure device or power of the energy beam that the measuring device is positioned at a respectively correct distance from the construction plane or focal plane. Accordingly, automatable or automated, or standardizable or standardized, measuring methods are realizable for a large range of powers or power densities of respective energy beams to be measured.

Expediently, during operation, the measuring device (and hence also the energy beam widening device assigned thereto) is arranged independently of the output power of the exposure device or of the power of the energy beam to be measured in view of its power or power density at constant positioning, in particular vertical positioning, relative to at least a reference point of the apparatus, in particular the construction plane of the apparatus, in which the selective solidification of construction material layers takes place, and/or a focal plane of the energy beam. In this way, the use or handling of the measuring device is significantly improved. In the case of an appropriate arrangement of the measuring device, this may relate to an arrangement of the measuring device relative to the construction plane of the apparatus that has a distance, in particular a maximum distance, of about 60 mm from the construction plane of the apparatus, independently of the output power of the exposure device or of the power of the energy beam that is to be measured in view of its power or power density. The upper side of the measuring device, i.e. a housing structure of the measuring device, may therefore have a distance, in particular a maximum distance, of around 60 mm from the construction plane of the apparatus. In particular, the distance between the construction plane or focal plane on the one hand and the plane of the measuring element on the other hand is 60 mm, in particular at most 60 mm. If the energy beam widening device that is optically disposed upstream of the measuring device is considered, this may relate to an arrangement of the energy beam widening device relative to the construction plane of the apparatus that has a distance, in particular a maximum distance, of about 90 mm from the construction plane of the apparatus, independently of the output power of the exposure device or of the power of the energy beam that is to be measured in view of its power or power density. The upper side of the energy beam widening device, i.e. a housing structure of the energy beam widening device, may therefore have a distance, in particular maximum distance, of around 90 mm from the construction plane or focal plane of the apparatus.

The measuring device may comprise a housing structure with, in particular, a cuboid-like or cube-like embodiment, said housing structure forming a main body of the measuring device. Here, a measuring-device-side energy beam input face is typically arranged or embodied at or in an outer face of the housing structure. The functional components of the measuring device that are required to measure the power or power density, i.e., for example, the aforementioned measuring element, are arranged or embodied at or in the housing structure.

The energy beam widening device, too, may comprise a housing structure with, in particular, a cuboid-like embodiment. The energy-beam-widening-device-side housing structure is arrangeable or arranged above the outer face of the housing structure of the measuring device, at or in which the energy beam input face is arranged or embodied. In particular, the housing structure of the energy beam widening device may be fastened to the housing structure of the measuring device, for example by means of an interlocking and/or force fit and/or cohesive type of fastening, such that the two housing structures form an assembly that can be handled together.

At this point, it should be mentioned in general that the measuring device (typically in addition to the energy beam widening device) is inserted into a process chamber of the apparatus that can be made inert for the purposes of measuring the power or power density. In this case, the apparatus is in a measurement mode. In the case of a construction mode of the apparatus, in which the actual additive construction of three-dimensional objects takes place, the measuring device is typically arranged outside of the process chamber of the apparatus.

The apparatus may comprise a holding device, in particular a plate-like or plate-shaped holding device, said holding device being intended to be assigned to the measuring device and arrangeable or arranged in the construction plane of the apparatus. The holding device comprises a plurality of defined measuring positions or holding positions, in which the measuring device or an adapter device that bears the measuring device is holdable with defined spatial positioning relative to a reference point of the apparatus, for example the construction plane and/or focal plane.

A corresponding adapter device may comprise a first section (holding section), by means of which the adapter device can be housed in a corresponding holding position of the holding device, and at least one second section (bearing section), by means of which the adapter device bears at least a measuring device. A measuring device that is mounted by means of an adapter device is always arranged with defined spatial positioning, in particular vertical positioning, relative to at least a reference point of the apparatus, in particular the construction plane or focal plane of the apparatus. As mentioned, an appropriate arrangement may be an arrangement of the measuring device relative to the construction plane or focal plane of the apparatus at a distance of about 60 mm from the construction plane or focal plane.

Respective holding positions may be formed, for example, by recesses that are embodied in a defined arrangement, for example in a matrix-like, i.e. row-like and/or column-like arrangement, in a main body, in particular a plate-like or plate-shaped main body, of the holding device, in which the measuring device or an adapter device that bears the measuring device is fastenable, in particular in an interlocking manner. For the purposes of fastening the measuring device or adapter device to the holding device, fastening elements are arranged or formed both on the side of the measuring device or adapter device and on the side of the holding device, said fastening elements being configured to interact in the respective holding positions while forming (non-destructively) detachable fastening of the measuring device or adapter device. In the case of interlocking fastening of the measuring device or adapter device in respective holding positions, appropriate fastening elements may be form-fit elements, i.e., for example, form-fit projections or form-fit receptacles, or plug-in elements, i.e., for example, plug-in projections and plug-in receptacles. As mentioned, the fastening of the measuring device or adapter device in the respective holding positions is typically detachable; consequently, the fastening of the measuring device or adapter device in a holding device can be released when necessary, i.e. the measuring device or adapter device can be removed from the holding position and fastened in another holding position.

It is conceivable that the measuring device or an adapter device that bears the measuring device is movably mounted in at least one degree of freedom of motion, in particular with a sliding movement, between at least two holding positions. Respective holding positions can be connected to one another by guiding sections that define trajectories of the measuring device, along which the measuring device is movably mounted. The handling of the measuring device may be improved by movable mounting of the measuring device or adapter device.

In terms of area, the holding device may be dimensioned in such a way that it covers the construction plane of the apparatus at least in sections, in particular completely. In particular, in terms of area the holding device may be dimensioned in such a way that it is arrangeable or arranged within a construction chamber of the apparatus that typically forms a constituent of a construction module. The expedient embodiment of a holding device, which is dimensioned in such a way that it completely covers the construction plane of the apparatus, facilitates a multiplicity of different holding or measuring positions, and so energy beams that also extend at an angle relative to a normal are measurable, within the scope of carrying out measurement processes, with a high reproducibility in view of their power or power density.

The holding device may comprise a plurality of holding device segments that are fastenable or fastened to one another and, in particular, movably mounted in relation to one another. The segmentation of the holding device into a plurality of holding device segments improves the manageability or transportability of the holding device. By way of example, holding device segments that are fastenable or fastened to one another and movably mounted in relation to one another may be movably mounted between a first position (operating position), in which these are moved relative to one another in such a way that they completely cover the construction plane of the apparatus, and a second position (non-operating position), in which these are moved relative to one another in such a way that they do not completely cover the construction plane of the apparatus. By way of example, a movable mount of respective holding device segments may be realised by a fold or swivel mount of the holding device segments, which facilitate folding or swivelling of a holding device segment relative to a second holding device segment.

As mentioned, the apparatus may comprise a beam deflection device that is assignable or assigned to the exposure device. The beam deflection device is configured to deflect the energy beam onto a measuring device—this always means a measuring device with an energy beam widening device, as described, that is arranged at a housing structure of the measuring device—that is held in a specific holding position. In particular, the beam deflection device is configured to steer an energy beam to differently positioned measuring devices, i.e., in particular, measuring devices that are held in different holding positions, in accordance with a succession or sequence that is predetermined or predeterminable, in particular by way of the user. By way of predetermining appropriate successions or sequences, it is possible to implement defined measuring programs, for example for recording power curves or power characteristics for quality assurance purposes. To this end, a control device of the apparatus that is implemented in terms of hardware and/or software may interact with the beam deflection device by way of control technology.

Accordingly, the beam deflection device may be controllable or controlled depending on control commands that are produced by a control device that is implemented in terms of hardware and/or software. The control device may be configured to produce the control commands on the basis of user inputs that are provided via a user interface, in particular a touch display device, of the apparatus. By way of an appropriate user interface, it is possible, in particular, to predetermine corresponding holding measuring positions, onto which an energy beam should be steered, or corresponding successions or sequences, according to which an energy beam should be steered to measuring devices that are held in different holding positions.

In addition to the described apparatus, the invention also relates to a measuring device for an appropriate apparatus.

The measuring device is configured to measure the power, in particular the power density, of the energy beam that is produced by an exposure device and comprises a measuring element that comprises an energy beam input face. The measuring device is distinguished by at least an energy beam widening device that is disposed or embodied to be upstream of the energy beam input face, said energy beam widening device being configured to widen, in particularly optically widen, an energy beam that is to be measured in view of its power. All explanations in conjunction with the apparatus apply analogously to the measuring device.

Furthermore, the invention relates to a method for measuring the power, in particular the power density, of an energy beam of an exposure device of an apparatus for additively producing three-dimensional objects. The apparatus is configured to additively produce three-dimensional objects by successive layer-by-layer selective exposure and, accompanying this, successive layer-by-layer selective solidification of construction material layers made of a construction material that can be solidified by means of an energy beam and comprises an exposure device which is configured to produce an energy beam for successive layer-by-layer selective exposure and, accompanying this, successive layer-by-layer selective solidification of construction material layers made of a construction material that can be solidified by means of the energy beam. The method is distinguished by virtue of using at least a measuring device, in particular a measuring device of the described apparatus, for the purposes of carrying out said method. All explanations in conjunction with the apparatus therefore also apply analogously to the method.

Hence, what is essential to the method is that the measuring device (and hence also the energy beam widening device assigned thereto) can be arranged or is arranged independently of the output power of the exposure device or of the power of the energy beam that is to be measured in view of its power or power density, at constant positioning, in particular vertical positioning, relative to at least a reference point of the apparatus, in particular the construction plane of the apparatus, in which the selective solidification of construction material layers takes place, and/or a focal plane of the energy beam.

BRIEF DESCRIPTION OF THE DRAWINGS

The invention is explained in more detail on the basis of exemplary embodiments in the figures of the drawing. In the drawing.

DETAILED DESCRIPTION OF THE DRAWINGS

Figure 1:
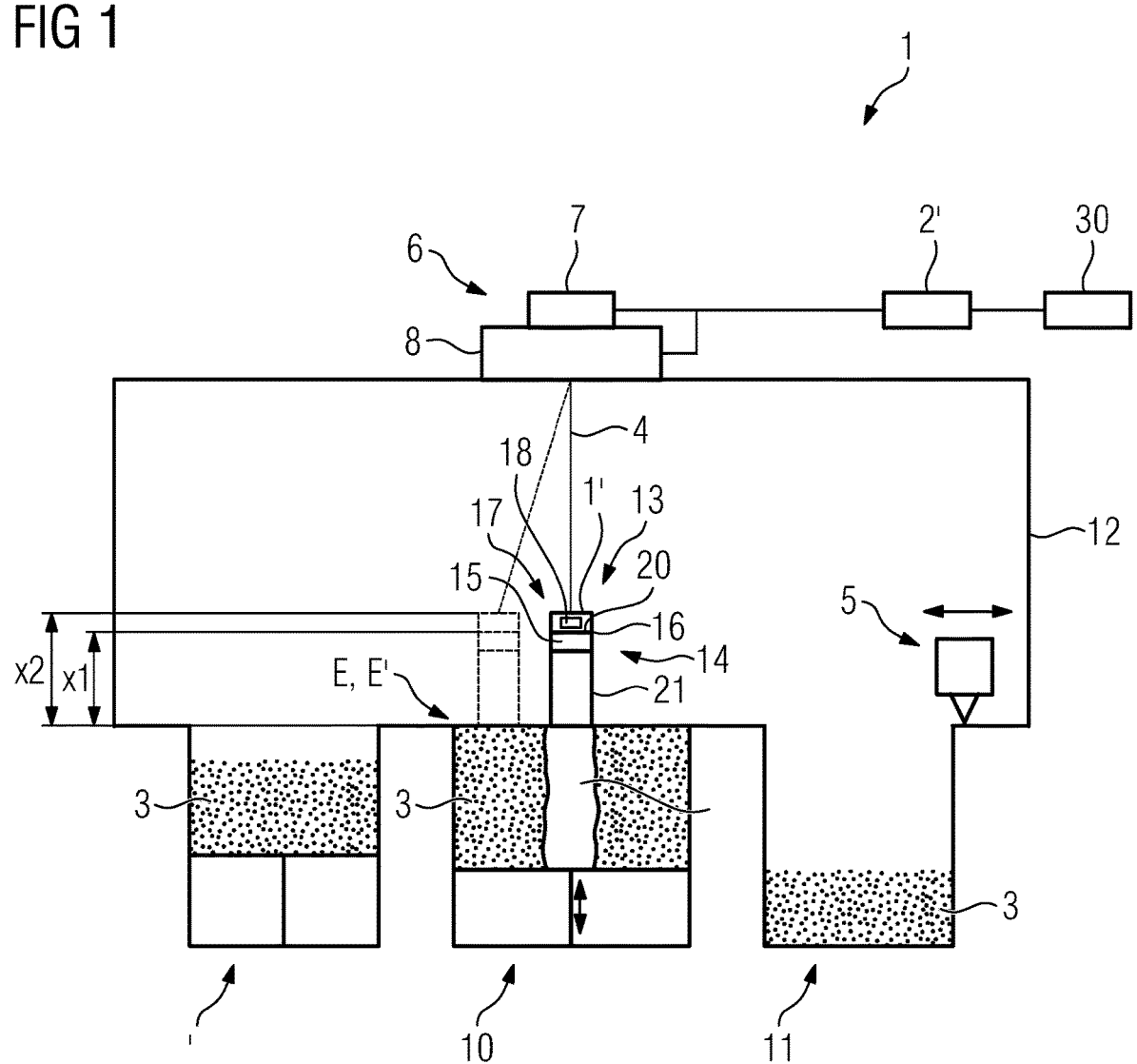
FIG. 1 shows a schematic diagram of an apparatus in accordance with an exemplary embodiment in a schematic view.

FIG. 1 shows a schematic diagram of an apparatus 1 in accordance with an exemplary embodiment in a purely schematic view.

In general, the apparatus 1 serves to additively produce three-dimensional objects 2, i.e., in particular, technical components or technical component assemblies, by successive layer-by-layer selective exposure and, accompanying this, successive layer-by-layer selective solidification of construction material layers made of a construction material 3, i.e., for example, a metal powder, that can be solidified by means of an energy beam 4, i.e., in particular, a laser beam. The selective solidification of respective construction material layers to be solidified is carried out on the basis of object-related construction data. Appropriate construction data describe the geometric or geometric structural form of the respective object 2 that is to be produced additively and may contain e.g. "sliced" CAD data of the object 2 to be produced. By way of example, the apparatus 1 can be embodied as a laser CUSING® apparatus, i.e. as an apparatus for carrying out selective laser melting methods (SLM methods).

The apparatus 1 comprises the functional components that are required to carry out the additive construction processes; by way of example, FIG. 1 shows a coating device 5 and an exposure device 6. The coating device 5 is configured to form construction material layers that are to be selectively exposed and selectively solidified, in a construction plane E or a construction field of the apparatus 1 and, to this end, comprises—as indicated by the double-headed arrow P1—a coating element (not provided with a reference sign), in particular a blade-like or blade-shaped coating element, that is movably mounted relative to a construction plane or construction field of the apparatus 1. The exposure device 6 is configured to produce an energy beam 4 for selective exposure of construction material layers that are to be solidified selectively in the construction plane E of the apparatus 1 and, to this end, typically comprises a beam producing device 7 which is configured to produce the energy beam 4, optionally a beam deflection device 8 (scanner device) which is configured to deflect the energy beam 4 that was produced by the beam producing device 8, for example onto a region to be exposed of a construction material layer that is to be solidified selectively, and various optical elements, such as e.g. filter elements, objective elements, lens elements, etc. (not shown).

FIG. 1 further presents a metering module 9, a construction module 10 and an overflow module 11, which are docked to a lower region of a process chamber 12 of the apparatus 1 that can be made inert. The aforementioned modules may also form a lower region of the process chamber 12 of the apparatus 1.

In the exemplary embodiment shown in FIG. 1, the apparatus 1 is in a measurement mode, in which a measuring device 13 that is assignable or assigned to the exposure device 6 is inserted into the process chamber 12 for the purposes of measuring the power or power density of the energy beam 4.

The measuring device 13 is configured to measure the power, i.e., in particular, the power density, of the energy beam 4. The measuring device 13 comprises an input coupling region 14, by means of which an energy beam 4 to be measured is coupleable into the measuring device 13. The input coupling region 14 is formed by an energy beam input face 16 that forms a part of a measuring element 15 of the measuring device 13. The measuring element 15 may be embodied as an absorber element, which is configured to absorb the energy beam 4. Accordingly, the power or power density of the energy beam 4 can be measured on the basis of an absorption of the energy beam 4 that impinges on the measuring element 15 and of a physical change of state, in particular a thermal change of state, of the measuring element 15 connected therewith. Specifically, the power or power density of the energy beam 4 can be measured on the basis of a heating of the measuring element 15 that can be traced back to an absorption of the energy beam 4 that impinges on the measuring element 15, with the heating of the measuring element 15 facilitating the drawing of conclusions in relation to the power or power density of the energy beam 4.

Figure 2:
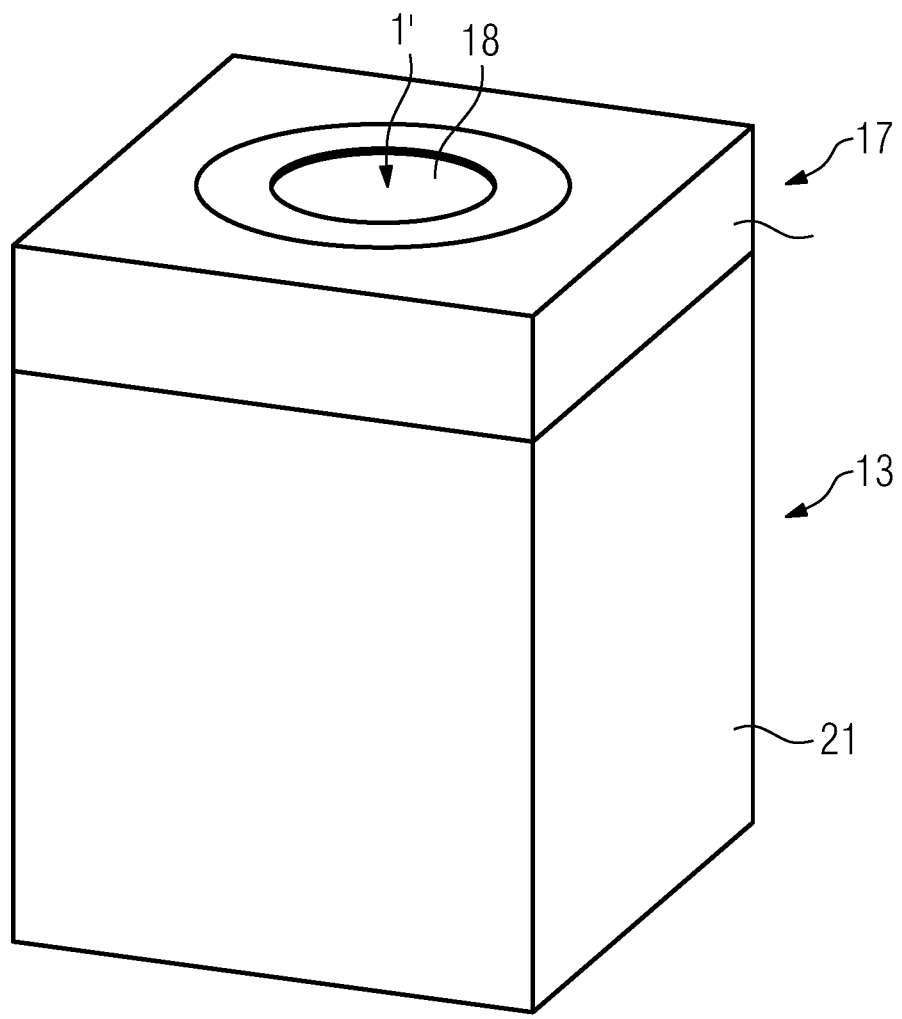
FIG. 2 shows a schematic diagram of a measuring device in accordance with an exemplary embodiment in a perspective view.

An energy beam widening device 17 is (optically) disposed or embodied to be upstream of the energy beam input face 16 of the measuring device 13 (cf., in particular, FIG. 2 as well). Accordingly, the energy beam 4 initially impinges on the energy beam widening device 17 before it impinges on the energy beam input face 16 of the measuring device 13. The energy beam widening device 17 is configured to widen an energy beam 4 that is to be measured in view of its power or power density. To this end, the energy beam widening device 17 comprises at least an energy beam widening element 18, which is configured to widen the energy beam 4. The energy beam widening element 18 is an optical element, in particular a lens.

The energy beam widening device 17 comprises an input coupling region 19, by means of which an energy beam 4 that is to be widened is coupleable into the energy beam widening device 17, and an output coupling region 20, by means of which a widened energy beam 4 can be coupled out of the energy beam widening device 17. The output coupling region 20 of the energy beam widening device 17, as emerges from FIG. 1, is arranged opposite the input coupling region 14 of the measuring device 13 during operation of the measuring device 13 such that a widened energy beam 4 that has been coupled out of the energy beam widening device 17 can be coupled into the measuring element 15.

The possible widening of the energy beam 4 by way of the energy beam widening device can avoid damage to the measuring device 13 on account of an energy influx that is too high, particularly in the case of comparatively high output powers of the exposure device 6 or comparatively high powers of the energy beam 4. Accordingly, the energy beam 4 is widened with the goal of reducing the energy influx that is introduced into the measuring device 13 by way of the energy beam 4 in order to avoid damage to the measuring device 13. What emerges therefrom is that the measuring device 13 may be positioned independently of the output power of the exposure device 6 or of the power of the energy beam 4. As a consequence, the use or handling of the measuring device 13 is less complicated and less susceptible to errors since care need not be taken for every output power of the exposure device 6 or power of the energy beam 4 that the measuring device 13 is positioned at a respectively correct distance from the construction plane or focal plane of the apparatus 1.

During operation, the measuring device 13 (and hence also the energy beam widening device 17 assigned thereto) is arranged independently of the output power of the exposure device 6 or of the power of the energy beam 4 to be measured in view of its power or power density at constant positioning, in particular vertical positioning, relative to at least a reference point of the apparatus, in particular the construction plane E of the apparatus 1 and/or the focal plane E' of the energy beam 4.

In the exemplary embodiment shown in FIG. 1, this relates, in an exemplary fashion, to an arrangement of the measuring device 13 relative to the construction plane E that has a constant distance from the construction plane E of at most 60 mm, as indicated by the distance specification x1, in the case of an appropriate arrangement of the measuring device 13. The upper side of the measuring device 13, i.e. of a housing structure 21 of the measuring device 13, consequently has a maximum distance of 60 mm from the construction plane E. Accordingly, the distance between construction plane or focal plane E, E' on the one hand and the plane of the measuring element 15 on the other hand is at most 60 mm. If the energy beam widening device 17 is considered, this relates, in an exemplary fashion, to an arrangement of the energy beam widening device 17 relative to the construction plane E that has a distance from the construction plane E of at most 90 mm, as indicated by the distance specification x2. The upper side of the energy beam widening device 17, i.e. of a housing structure 22 of the energy beam widening device 17, consequently has a maximum distance of 90 mm from the construction plane or focal plane E, E'.

In conjunction with FIG. 1, it should be observed that the operation of the measuring device 13, i.e. the performance of corresponding measuring processes, typically only occurs if the apparatus 1 is free from construction material 3, i.e., in particular, if no construction material 3 is situated within the process chamber 12 of the apparatus 1. Further, no component 2 should be situated within the apparatus 1, i.e., in particular, within the process chamber 12 of the apparatus 1, during the operation of the measuring device 13.

Figure 3:
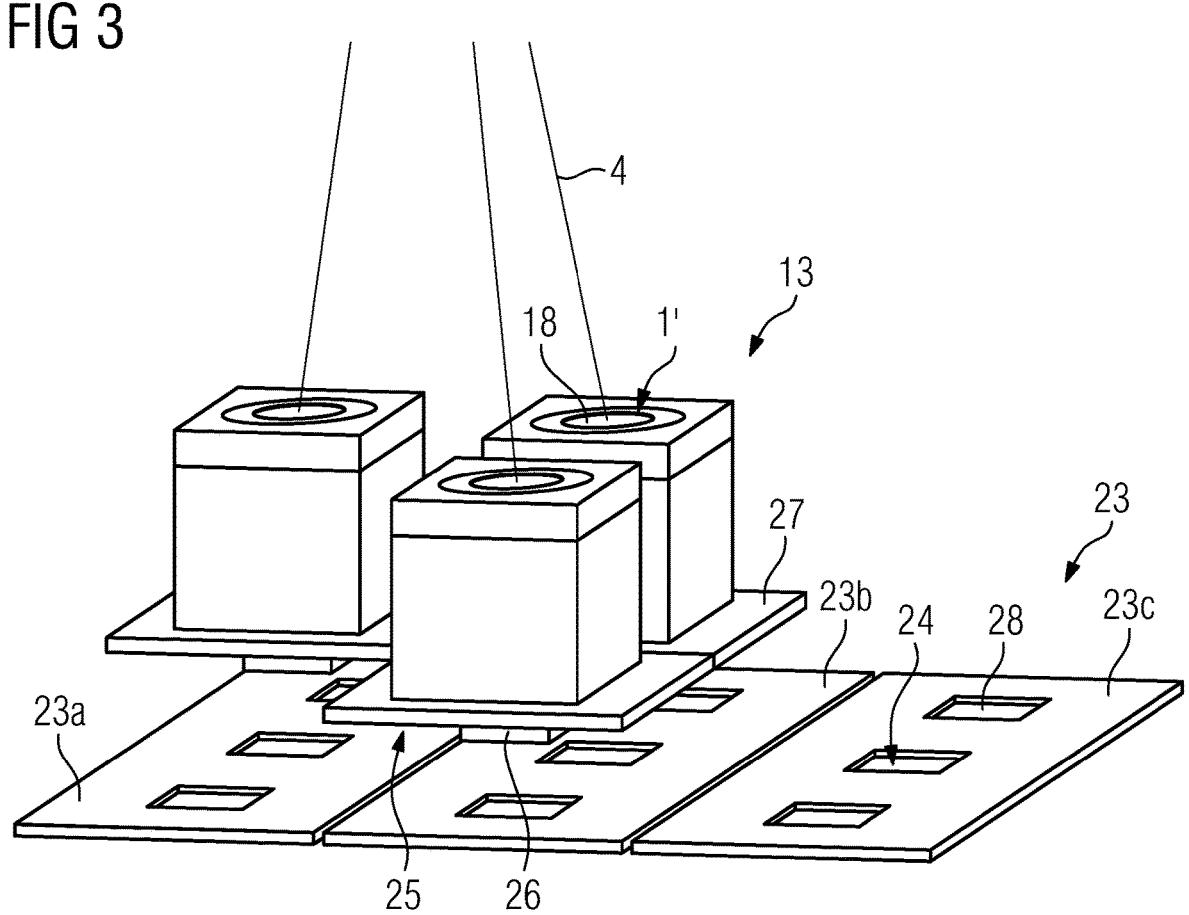
FIG. 3 shows a schematic diagram of a measuring device that is arranged in a holding device, in accordance with an exemplary embodiment, in a perspective view.

On the basis of FIGS. 2 and 3, it is possible to recognize that the measuring device 13 comprises a housing structure 21, for example with a cuboid-like or cube-like embodiment, that forms a main body of the measuring device 13. The measuring-device-side energy beam input face 16 is arranged at or in an outer face of the housing structure 21 in this case. Functional components of the measuring device 13 that are required for measuring the power or power density, i.e., for example, the measuring element 15, are arranged at or in the housing structure 21.

On the basis of FIGS. 2 and 3, it is further possible to recognize that the energy beam widening device 17, too, comprises a housing structure 22 with, in particular, a cuboid-like embodiment. The housing structure 22 of the energy beam widening device 17 is arranged above the outer face of the housing structure 21 of the measuring device 13, at or in which the energy beam input face 16 is arranged. The housing structure 22 of the energy beam widening device 17 may be fastened to the housing structure 21 of the measuring device 13, for example by means of an interlocking and/or force fit and/or cohesive type of fastening, such that the two housing structures 21, 22 form an assembly that can be handled together.

On the basis of FIG. 3, it is possible to recognize that the apparatus 1 may comprise a plate-like or plate-shaped holding device 23, said holding device being intended to be assigned to the measuring device 13 and arrangeable or arranged in the construction plane E. The holding device 23 comprises a plurality of defined measuring positions or holding positions 24, in which the measuring device 13 or, as shown in FIG. 3, an adapter device 25 that bears the measuring device 13 is holdable with defined spatial positioning relative to a reference point of the apparatus 1, for example the construction plane or focal plane E, E'.

Here, the adapter device 25 comprises a web-like holding section 26, by means of which the adapter device 25 is holdable in a corresponding holding position 24 of the holding device 23, for example in an interlocking manner, and at least a second bearing section 26, by means of which the adapter device 25 bears at least one measuring device 13. It is possible to recognize that the measuring device 13 that is mounted by means of the adapter device 25 is always arranged with defined spatial positioning, in particular vertical positioning, relative to at least a reference point of the apparatus, in particular the construction plane or focal plane E, E'.

Respective holding positions 24 are formed by recesses 28 that are embodied in a defined arrangement, here e.g. in a matrix-like, i.e. row-like and/or column-like arrangement, in a plate-like or plate-shaped main body of the holding device 23, in which the measuring device 13 or the adapter device 25 that bears the measuring device 13 is fastenable, in particular in an interlocking manner. For the purposes of fastening the measuring device 13 or adapter device 25 to the holding device 23, fastening elements (not shown) are arranged or formed both on the side of the measuring device or adapter device and on the side of the holding device, said fastening elements being configured to interact in respective holding positions 24 while forming (non-destructively) detachable fastening of the measuring device 13 or adapter device 25. In the case of interlocking fastening of the measuring device 13 or adapter device 25 in respective holding positions 24, appropriate fastening elements may be form-fit elements, i.e., for example, form-fit projections or form-fit receptacles, or plug-in elements, i.e., for example, plug-in projections and plug-in receptacles.

In the exemplary embodiment shown in FIG. 1, the holding device 23 is dimensioned in terms of area in such a way that it completely covers the construction plane E. This facilitates a multiplicity of different holding and measuring positions, and so energy beams 4 that also extend at an angle relative to a normal are measurable, within the scope of carrying out measurement processes, with a high reproducibility in view of their power or power density. This is presented in FIG. 1 using dashed lines.

FIG. 3 shows that the holding device 23 may comprise a plurality of holding device segments 23a-23c that are fastenable or fastened to one another and, in particular, movably mounted in relation to one another. Holding device segments 23a-23c that are fastenable or fastened to one another and movably mounted in relation to one another may be movably mounted between an operating position shown in FIG. 3, in which these are moved relative to one another in such a way that they completely cover the construction plane E, and a non-operating position, in which these are moved relative to one another in such a way that they do not completely cover the construction plane E. By way of example, the movable mount of holding device segments 23a-23c may be realised by a fold or swivel mount of the holding device segments 23a-23c.

FIG. 3 indicates that the beam deflection device 8 is configured to deflect the energy beam 4 onto a measuring device 13 that is held in a specific holding position 24. Here, in particular, the beam deflection device 8 is configured to steer an energy beam 4 to differently positioned measuring devices 13, i.e., in particular, measuring devices that are held in different holding positions 24, in accordance with a succession or sequence that is predetermined or predeterminable, in particular by way of the user. By way of predetermining appropriate successions or sequences, it is possible to implement defined measuring programs, for example for recording power curves or power characteristics for quality assurance purposes. To this end, a control device 29 of the apparatus 1 that is implemented in terms of hardware and/or software interacts with the beam deflection device 8 by way of control technology.

Accordingly, the beam deflection device 8 is controllable or controlled depending on control commands that are produced by a control device 29. The control device 29 is configured to produce the control commands on the basis of user inputs that are provided via a user interface 30, in particular a touch display device, of the apparatus 1. By way of the user interface 30, it is possible, in particular, to predetermine corresponding holding measuring positions 24, onto which an energy beam 4 should be steered, or corresponding successions or sequences, according to which an energy beam 4 should be steered to measuring devices 13 that are held in different holding positions 24.

Using the apparatus 1 shown in FIG. 1, it is possible to implement a method for measuring the power, in particular the power density, of an energy beam 4 of an exposure device 6 of an apparatus 1 for additively producing three-dimensional objects 2. The method is distinguished by virtue of at least a corresponding measuring device 13 being used to carry out such method.

What is essential to the method is that the measuring device 13 (and hence also the energy beam widening device 17 assigned thereto) can be arranged or is arranged independently of the output power of the exposure device 6 or of the power of the energy beam 4 that is to be measured in view of its power or power density, at constant positioning, in particular vertical positioning, relative to at least a reference point of the apparatus 1, in particular the construction plane E of the apparatus 1 and/or the focal plane E' of the energy beam 4.

The invention claimed is:

1. An apparatus for additively producing three-dimensional objects by successive layer-by-layer selective exposure and successive layer-by-layer selective solidification of construction material layers made of a construction material that can be solidified by means of an energy beam, comprising:
    an exposure device configured to produce an energy beam for successive layer-by-layer selective exposure and successive layer-by-layer selective solidification of construction material layers made of a construction material that can be solidified by means of the energy beam,
    a measuring device that is assignable or assigned to the exposure device, said measuring device being configured to measure the power of the energy beam that is produced by the exposure device, and
    a holding device, said holding device being arrangeable or arranged in a construction plane of the apparatus and comprising a plurality of defined holding positions in which the measuring device or an adapter device that bears the measuring device is holdable with defined spatial positioning relative to a reference point of the apparatus,
    wherein the measuring device comprises a measuring element comprises an energy beam input face and an energy beam widening device that is disposed or embodied to be upstream of the energy beam input face, said energy beam widening device being configured to widen the energy beam that is to be measured in view of its power.

2. The apparatus according to claim 1, wherein the measuring device is arranged with constant positioning relative to at least a reference point of the apparatus independently of the power of the energy beam that is to be measured in view of its power density, the reference point comprising the construction plane of the apparatus and/or a focal plane of the energy beam.

3. The apparatus according to claim 1, wherein the measuring device comprises a housing structure, said housing structure forming a main body of the measuring device, wherein the energy beam input face is arranged or embodied at or in an outer face of the housing structure.

4. The apparatus according to claim 3, wherein the housing structure has a cuboid configuration.

5. The apparatus according to claim 1, wherein the energy beam widening device comprises a housing structure, said housing structure being arranged or arrangeable above the outer face of the housing structure of the measuring device, at or in which the energy beam input face is arranged or embodied.

6. The apparatus according to claim 1, wherein respective holding positions are formed by recesses in a main body of the holding device, wherein the measuring device or the adapter device that bears the measuring device is fastenable in said holding positions.

7. The apparatus according to claim 6, wherein the measuring device or the adapter device that bears the measuring device is movably mounted in at least a degree of freedom of motion between at least two holding positions.

8. The apparatus according to claim 6, wherein the holding device is dimensioned in such a way that it covers at least a portion of the construction plane of the apparatus.

9. The apparatus according to claim 8, wherein the holding device is dimensioned in such a way that it completely covers the construction plane of the apparatus.

10. The apparatus according to claim 6, wherein the holding device comprises a plurality of holding device segments that are fastenable or fastened to one another.

11. The apparatus according to claim 10, wherein the plurality of holding device segments that are fastenable or fastened to one another are movably mounted in relation to one another.

12. The apparatus according to claim 6, wherein the measuring device or the adapter device that bears the measuring device is fastenable in the holding positions in an interlocking manner.

13. The apparatus according to claim 1, further comprising:
    a beam deflection device that is assignable or assigned to the exposure device, said beam deflection device being configured to deflect the energy beam onto a measuring device that is held in a specific holding position.

14. The apparatus according to claim 13, wherein the beam deflection device is configured to steer the energy beam to measuring devices that are held in different holding positions in a sequence that is predetermined or predeterminable.

15. The apparatus according to claim 13, wherein the beam deflection device is controlled or controllable depending on control commands that are produced by a control device.

16. The apparatus according to claim 1, wherein the measuring device configured to measure the power density of the energy beam that is produced by the exposure device.

17. A measuring device for an apparatus for additively producing three-dimensional objects, wherein:
    the measuring device is assignable or assigned to an exposure device configured to produce an energy beam for successive layer-by-layer selective exposure and successive layer-by-layer selective solidification of construction material layers made of a construction material that can be solidified by means of the energy beam;
    the measuring device is configured to measure the power of the energy beam that is produced by the exposure device;
    the measuring device or an adapter device that bears the measuring device is holdable with defined spatial positioning relative to a reference point of the apparatus by a holding device, wherein the holding device is arrangeable or arranged in a construction plane of the apparatus and comprises a plurality of defined holding positions; and
    the measuring device comprises a measuring element that comprises an energy beam input face and an energy beam widening device that is disposed or embodied to be upstream of the energy beam input face, wherein the energy beam widening device is configured to widen the energy beam that is to be measured in view of its power.

18. The measuring device of claim 17, wherein the measuring device is arranged with constant positioning relative to at least a reference point of the apparatus independently of the power of the energy beam that is to be measured in view of its power density, the reference point comprising the construction plane of the apparatus and/or a focal plane of the energy beam.

19. The measuring device of claim 17, wherein the measuring device or the adapter device that bears the measuring device is fastenable in respective holding positions of the plurality of defined holding positions, wherein the respective holding positions are formed by recesses in a main body of the holding device.

20. A method for measuring the power of an energy beam of an exposure device of an apparatus for additively producing three-dimensional objects, the method comprising:
    producing, with an exposure device, an energy beam for successive layer-by-layer selective exposure and successive layer-by-layer selective solidification of construction material layers made of a construction material that can be solidified by means of the energy beam;
    arranging a holding device in a construction plane of the apparatus, the holding device comprising a plurality of defined holding positions,
    holding, with the holding device, the measuring device or an adapter device that bears the measuring device with defined spatial positioning relative to a reference point of the apparatus;
    widening, with an energy beam widening device that is disposed or embodied to be upstream of an energy beam input face, the energy beam; and
    measuring, with a measuring element, the energy beam in view of its power.

* * * * *